(12) United States Patent
Schuette et al.

(10) Patent No.: US 7,738,252 B2
(45) Date of Patent: Jun. 15, 2010

(54) METHOD AND APPARATUS FOR THERMAL MANAGEMENT OF COMPUTER MEMORY MODULES

(75) Inventors: Franz Michael Schuette, Colorado Springs, CO (US); Ryan M. Petersen, Sunnyvale, CA (US); Eric L. Nelson, Rancho Palos Verdes, CA (US); Bhulinder Sethi, Sunnyvale, CA (US)

(73) Assignee: OCZ Technology, Group, Inc., San Jose, CA (US)

( * ) Notice: Subject to any disclaimer, the term of this patent is extended or adjusted under 35 U.S.C. 154(b) by 306 days.

(21) Appl. No.: 11/621,396

(22) Filed: Jan. 9, 2007

(65) Prior Publication Data

US 2007/0159789 A1   Jul. 12, 2007

Related U.S. Application Data

(60) Provisional application No. 60/766,292, filed on Jan. 9, 2006.

(51) Int. Cl.
*H05K 7/20* (2006.01)
*G06F 1/20* (2006.01)

(52) U.S. Cl. .................. 361/704; 361/679.54; 361/690; 361/692; 361/715; 361/719; 165/185; 174/16.3

(58) Field of Classification Search ............ 361/679.46, 361/679.54, 690, 692, 704, 715, 719; 165/80.3, 165/185; 174/16.3; 454/184

See application file for complete search history.

(56) References Cited

U.S. PATENT DOCUMENTS

| | | | | |
|---|---|---|---|---|
| 6,188,576 | B1 * | 2/2001 | Ali et al. | 361/704 |
| 6,269,003 | B1 * | 7/2001 | Wen-Chen | 361/704 |
| 6,377,460 | B1 * | 4/2002 | Pohl et al. | 361/704 |
| 6,967,843 | B2 * | 11/2005 | Rubenstein et al. | 361/703 |
| 7,023,700 | B2 * | 4/2006 | Chiou et al. | 361/704 |
| 7,028,754 | B2 * | 4/2006 | Boudreaux | 165/80.3 |
| D531,965 | S  * | 11/2006 | Stathakis | D13/179 |
| 7,215,551 | B2 * | 5/2007 | Wang et al. | 361/707 |
| 7,483,273 | B2 * | 1/2009 | Uehara et al. | 361/715 |
| 2006/0067054 | A1 * | 3/2006 | Wang et al. | 361/704 |
| 2007/0285895 | A1 * | 12/2007 | Gruendler et al. | 361/711 |
| 2008/0151487 | A1 * | 6/2008 | Ni et al. | 361/684 |
| 2008/0212297 | A1 * | 9/2008 | Ni et al. | 361/760 |
| 2009/0122481 | A1 * | 5/2009 | Chang et al. | 361/679.54 |

FOREIGN PATENT DOCUMENTS

WO      WO 2005081309 A2 *    9/2005

* cited by examiner

*Primary Examiner*—Jayprakash N Gandhi
*Assistant Examiner*—Robert J Hoffberg
(74) *Attorney, Agent, or Firm*—Hartman & Hartman, P.C.; Gary M. Hartman; Domenica N.S. Hartman

(57) ABSTRACT

A heat spreader and method for thermal management of a computer memory module by promoting natural convection cooling of the memory module. The heat spreader includes a frame surrounding a planar body adapted to be mounted to a memory module of a computer, and a grid defined in the planar body by a plurality of uniformly distributed perforations. The perforations extend through the planar body to allow natural convention between an interior space beneath the planar body and an exterior space above the planar body.

7 Claims, 2 Drawing Sheets

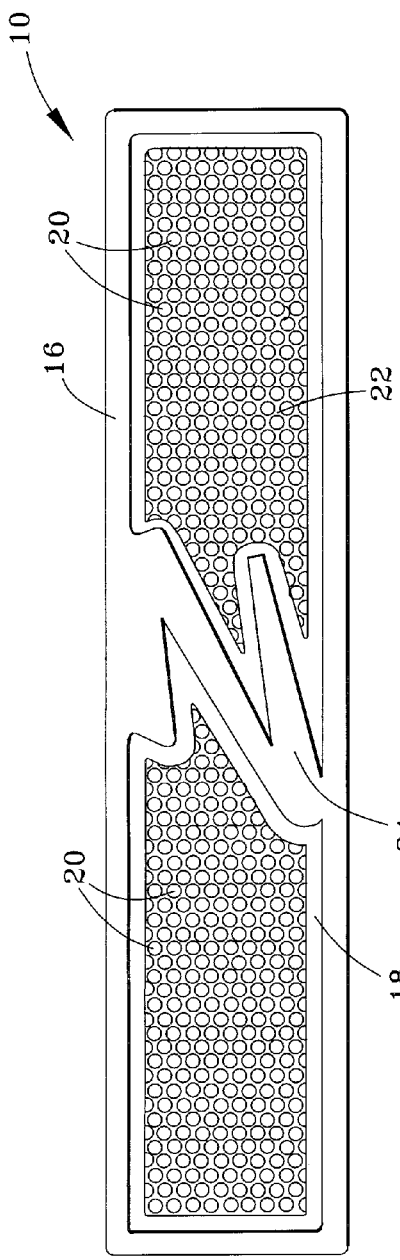
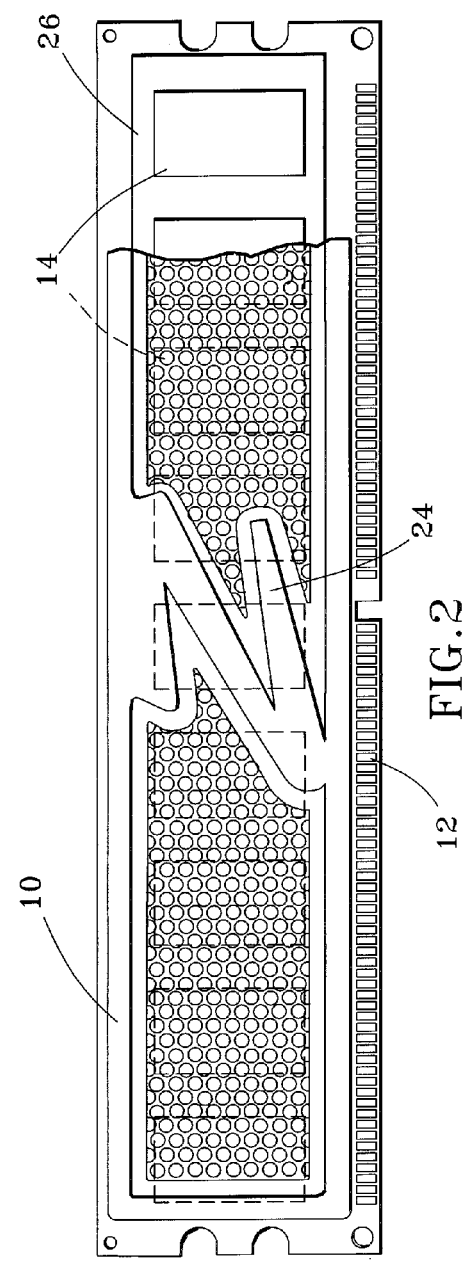

METHOD AND APPARATUS FOR THERMAL MANAGEMENT OF COMPUTER MEMORY MODULES

CROSS REFERENCE TO RELATED APPLICATIONS

This application claims the benefit of U.S. Provisional Application No. 60/766,292, filed Jan. 9, 2006, the contents of which are incorporated herein by reference.

BACKGROUND OF THE INVENTION

The present invention relates to thermal management equipment and methods for computer memory modules, and more particular to a heat spreader that can be assembled with a memory module to promote natural convection cooling of the module.

Memory bandwidth requirements have steadily increased as a countermeasure against data starvation of central processors of personal computers. A number of different strategies have been employed to provide better data throughput to and from the system memory pool. The three most important measures have been to increase the memory clock frequency, increase the data rate, and increase the number of physical banks to allow for more pages that can be held open.

As a rule of thumb, power consumption of any integrated circuit increases in a linear fashion with the clock frequency and, therefore, the migration to higher memory core frequencies necessarily results in higher power draw. Likewise, the increased power consumption of open memory pages is well documented. Combined, the higher operating frequency, along with the increased system memory density and higher number of ranks/open pages, have reached a stage where heat dissipation of computer memory modules becomes a limiting factor. For example, in high density DDR2 SDRAM (double-data-rate two synchronous dynamic random access memory) components, a new access latency has been introduced to add wait cycles between bank-interleaved read accesses during the four bank activation window (tFAW), without which the memory components might incur thermal runaway.

Recently, thermal management of memory modules has employed dedicated memory heat spreaders that are added to the modules and serve the purpose of thermally buffering and dissipating the heat generated by the memory IC's. Typically, heat spreaders have been designed to have a solid surface for maximum contact with the individual components. However, a major drawback of such a configuration is that the heat spreader encapsulates the modules and traps the air space between the components. This trapping of heat does not affect the short term buffering of thermal transients by the heat spreaders, but raises the overall operating temperature of the modules.

The issue of heat trapping is especially of concern in the case of registered modules where a high speed clock chip or phase lock loop (PLL) chip and registers are added, either of which consumes constant power at a rate higher than that of the average memory IC. This has led to either overheating of the PLL and heating of the memory chips by the PLL.

In view of the heat-trapping problem, dedicated memory fans have been employed to reduce the dead air space between memory modules enclosed by solid-surface heat spreaders. While effective, fans incur an additional and undesirable cost. Other proposed solutions include the use of water-cooled memory modules that are more efficient, but are also more expensive to implement than fan cooling. In view of the above, there is a need for effective but less expensive cooling solutions for memory modules.

BRIEF SUMMARY OF THE INVENTION

The present invention provides a heat spreader and method for thermal management of a computer memory module by promoting natural convection cooling of the memory module.

According to a first aspect of the invention, the heat spreader includes a frame surrounding a planar body adapted to be mounted to a memory module of a computer, and a grid defined in the planar body by a plurality of uniformly distributed perforations. The perforations extend through the planar body to allow natural convention between a heat source (such as a memory module) within an interior space beneath the planar body and an exterior space above the planar body.

According to a first aspect of the invention, a method for thermal managing a computer memory module is provided that entails mounting a heat spreader on the memory module so that a planar body of the heat spreader contacts memory components on the memory module. Heat is then dissipated from the memory components by thermal conduction through the planar body and natural convection through perforations that extend through the planar body and induce natural convention between an interior space within the heat spreader and surrounding the memory module and an exterior space outside the heat spreader.

When mounted on an operating memory module, a temperature differential is created between the interior of the heat spreader heated by the memory module and the exterior of the heat spreader, causing natural air convection to occur through the perforations particularly if the heat spreader is mounted on top of the memory module so that its planar interior region is substantially horizontal. The perforations also promote turbulent air flow that further promotes thermal exchange between the heat spreader and the environment surrounding the heat spreader, in contrast to laminar air flow that typically occurs across surfaces of conventional heat spreaders. As a result, the heat spreader and method of this invention promote improved memory performance, stability, and longevity, without the costs associated with other cooling techniques, such as water-cooled memory cooling equipment.

Other objects and advantages of this invention will be better appreciated from the following detailed description.

BRIEF DESCRIPTION OF THE DRAWINGS

FIG. 1 is a plan view of a perforated heat spreader in accordance with a first embodiment of the invention.

FIG. 2 is a perspective view showing the perforated heat spreader of FIG. 1 attached to a memory module in accordance with the invention.

DETAILED DESCRIPTION OF THE INVENTION

Figure 3:
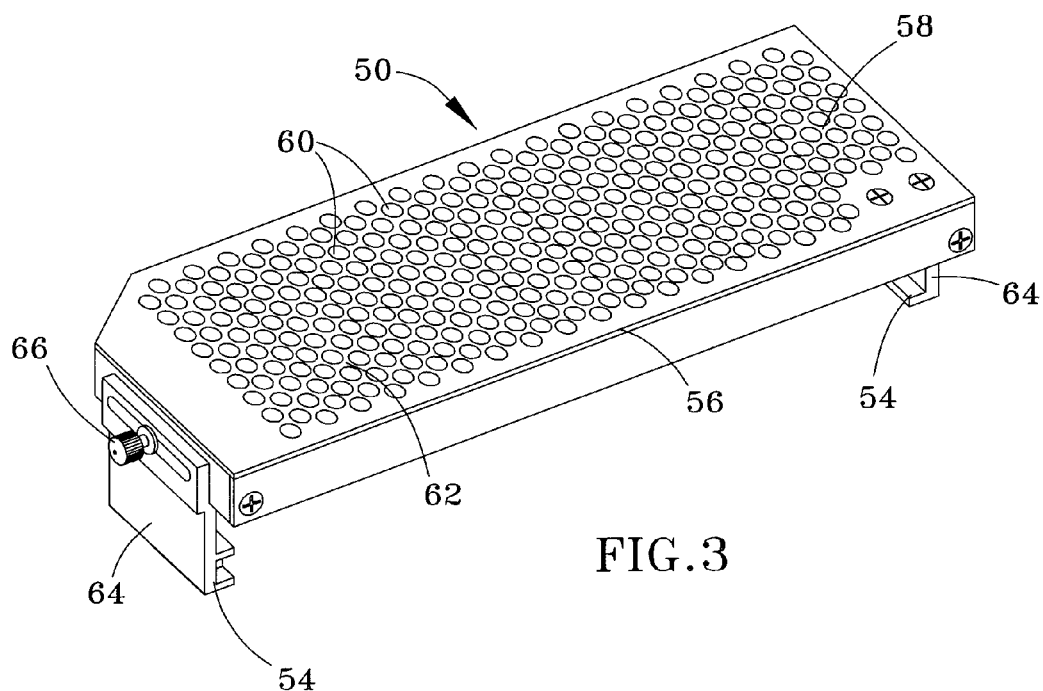
FIG. 3 is a perspective view of a perforated heat spreader in accordance with a second embodiment of the invention.

FIGS. 1 through 4 represent perforated heat spreaders 10 and 50 for use with computer memory modules, such as the memory module 12 represented in FIG. 2 as comprising a number of memory chips 14. As represented in FIGS. 1 through 4, the heat spreaders 10 and 50 have generally rectangular shapes, which as evident from FIG. 2 approximately coincides with the peripheral shape of the memory module 12 with which the heat spreader 10 is used. Preferred materials for the heat spreaders 10 and 50 include aluminum, copper, and other metal and metal alloy materials commonly used as heat sinks and conductors for thermal management applications, though it is foreseeable that other materials with reasonably good thermal conduction could also be used.

The outline of the heat spreader 10 of FIGS. 1 and 2 is defined by a frame 16 that surrounds an interior region 18 of the heat spreader 10, in which a number of perforations 20 are formed (e.g., by stamping, molding, etc.) to extend through the thickness of the interior region 18 in a direction normal to the plane of the interior region 18. The interior region 18 is shown in FIGS. 1 and 2 as generally being a planar body, in that the upper surface of the interior region 18 is planar. The lower surface of the interior region 18 is also preferably planar and parallel to its upper surface. As evident from FIGS. 1 and 2, the perforations 20 preferably have the same size and shape, and are uniformly distributed and preferably equi-spaced throughout the interior region 18 of the heat spreader 10. In the Figures, a suitable equi-spaced distribution is illustrated by the perforations 20 being aligned in columns offset from each other to define a grid 22 having a honeycomb pattern. The lower surface of the interior region 18 of the heat spreader 10 preferably contacts the memory chips 14 to provide for conduction heat transfer from the chips 14 to the heat spreader 10, and the wall thickness of the interior region 18 is preferably sufficient to conduct heat away from the chips 14 and dissipate the heat to the grid 22, where natural air convection passing through the perforations 20 transfers the absorbed heat to the surrounding atmosphere. For this reason, the perforations 20 are of a sufficient size and number to allow air to freely flow through the interior region 18, thereby eliminating the trapping of heat within the cavity defined by and between the heat spreader 10 and the memory module 12. As evident from FIGS. 1 and 2, the cross-sectional width of any part segment of the grid 22 is less than one-half, for example, approximately one-quarter, the diameter of the perforations 20. The perforations 20 preferably account for about one-half, more preferably greater than one-half, of the total area of the interior region 18. Other than a logo 24 defined at the longitudinal center of the heat spreader 10, the interior region 18 is essentially entirely composed of the perforations 20 and grid 22.

Figure 4:
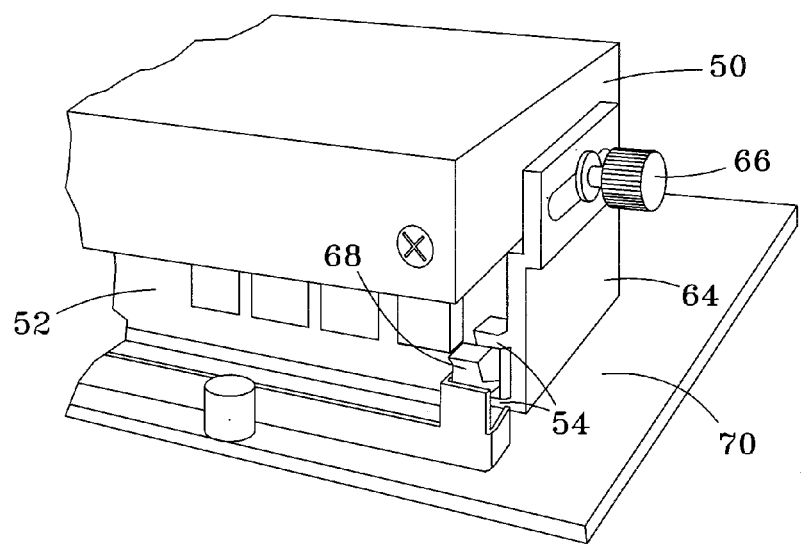
FIG. 4 is a detailed perspective view of one end of the perforated heat spreader of FIG. 3.

The heat spreader 10 of FIGS. 1 and 2 is configured for direct attachment to the memory module 12, for example, by bonding, such that the module 12 and its heat spreader 10 can be sold as a unit. In contrast, the heat spreader 50 of FIGS. 3 and 4 is configured to allow its installation on a memory module 52. The heat spreader 50 is represented as being equipped with brackets 64 at its opposite longitudinal ends, each mounted to the heat spreader 50 with a threaded fastener 66. Flanges 54 formed on each bracket 64 are sized and configured to engage a DIMM (dual in-line memory module) socket retention lever 68 of a motherboard 70, such that each end of the heat spreader 50 can be attached to the retention lever 68 by tightening the fasteners 66. Other fastening techniques are also possible and foreseeable by which the heat spreader 50 could be secured to a memory module 52, and such alternatives are also within the scope of this invention.

Other than the above additional features, the heat spreader 50 of FIGS. 3 and 4 can be similar in construction and function to the heat spreader 10 of FIGS. 1 and 2. For example, the heat spreader 50 is represented as including a frame 56 that surrounds an interior region 58 of the heat spreader 50, and perforations 60 within the interior region 58 form a honey-comb-like grid 62.

Because of the temperature differential that exits between the interior of the heat spreaders 10 and 50 heated by the memory modules 12 and 52 and the exterior of the heat spreaders 10 and 50, natural air convection occurs through the perforations 20 and 60 to promote an increased cooling effect, particularly if the heat spreaders 10 and 50 are mounted on top of their memory modules 12 and 52 so that their planar interior regions 18 and 58 are substantially horizontal. More particularly, instead of laminar air flow that typically occurs across surfaces of conventional heat spreaders, the perforated heat spreaders 10 and 50 of this invention have microchannels defined by the perforations 20 and 60 that improve the thermal exchange between the heat spreaders 10 and 50 and the environment surrounding the heat spreaders 10 and 50. Because of the size, number, and proximity of the perforations 20 and 60, the natural convection through the perforations 20 and 60 also tends to be turbulent, further promoting heat transfer between the heat spreaders 10 and 50 and their surroundings. The result is improved memory performance, stability, and longevity that allows the user to more freely modify the performance of the memory modules 12 and 52 without the costs associated with additional fans and water cooling equipment. The heat spreaders 10 and 50 can also be combined in combination with conventional fans to achieve still better cooling effectiveness.

While the invention has been described in terms of specific embodiments, it is apparent that other forms could be adopted by one skilled in the art. For example, the physical configurations of the heat spreaders 10 and 50 could differ from that shown, and materials and processes other than those noted could be use. Therefore, the scope of the invention is to be limited only by the following claims.

The invention claimed is:

1. A memory module and heat spreader assembly comprising: a memory module of a computer, the memory module comprising a circuit board, and memory components on at least a first surface of the circuit board; and a heat spreader disposed at the first surface of the circuit board and bonded to the memory module, the heat spreader comprising a planar body, and a frame surrounding and offset from the planar body, the frame defining an outer extent of the heat spreader so as to define an interior space beneath the planar body for enclosing the memory components, the planar body contacting the memory components to provide conduction heat transfer from the memory components to the heat spreader, the heat spreader further comprising a grid defined in the planar body by perforations comprising at least a first plurality of uniformly distributed openings, the perforations extending through the planar body to allow natural air convention between the memory module within the interior space and an exterior space outside the heat spreader, wherein the perforations constitute about one-half or more of the surface area of the planar body.

2. The memory module and heat spreader assembly according to claim 1, wherein the first plurality of uniformly distributed openings are uniformly distributed in the planar body such that the grid comprises a honeycomb pattern.

3. The memory module and heat spreader assembly according to claim 1, wherein the perforations constitute more than one-half of the surface area of the planar body.

4. The memory module and heat spreader assembly according to claim 1, wherein the frame and the planar body have rectangular shapes coinciding with the memory module and the outer extent of the heat spreader defined by the frame lies within an outer extent of the memory module.

5. The memory module and heat spreader assembly according to claim 1, wherein the planar body, the grid, and the perforations are in combination means for inducing natural air convection through the perforations when the planar body is horizontal and a heat source is below the planar body.

6. The memory module and heat spreader assembly according to claim 1, wherein the frame lacks perforations.

7. The memory module and heat spreader assembly according to claim 1, wherein the heat spreader is entirely located at the first surface of the circuit board.

* * * * *